US012705220B2

(12) United States Patent
Liu et al.

(10) Patent No.: US 12,705,220 B2
(45) **Date of Patent: *Aug. 11, 2026**

(54) SYSTEM AND METHOD FOR TRACEABLE PUSH-BASED ETL PIPELINE AND MONITORING OF DATA QUALITY IN ETL ENVIRONMENTS

(71) Applicant: ORACLE INTERNATIONAL CORPORATION, Redwood Shores, CA (US)

(72) Inventors: Chunming Liu, Clyde Hill, WA (US); Manasa Pola, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/956,644

(22) Filed: Nov. 22, 2024

(65) Prior Publication Data

US 2025/0077492 A1 Mar. 6, 2025

Related U.S. Application Data

(63) Continuation of application No. 18/236,214, filed on Aug. 21, 2023, now Pat. No. 12,189,588.

(51) Int. Cl.

| | |
|---|---|
| ***G06F 16/215*** | (2019.01) |
| ***G06F 16/23*** | (2019.01) |
| ***G06F 16/25*** | (2019.01) |
| ***G06F 16/26*** | (2019.01) |

(52) U.S. Cl.

CPC ........ *G06F 16/215* (2019.01); *G06F 16/2358* (2019.01); *G06F 16/254* (2019.01); *G06F 16/26* (2019.01)

(58) Field of Classification Search

CPC .............................. G06F 16/254; G06F 16/26

USPC ........................................................ 707/687

See application file for complete search history.

(56) References Cited

U.S. PATENT DOCUMENTS

| | | | | |
|---|---|---|---|---|
| 6,208,990 | B1 * | 3/2001 | Suresh | G06F 16/254 707/999.102 |
| 2015/0286748 | A1 * | 10/2015 | Lilley | G06F 16/28 707/794 |
| 2022/0374442 | A1 * | 11/2022 | Kaspa | G06F 16/2282 |
| 2024/0104580 | A1 * | 3/2024 | Mekala | G06F 16/254 |

* cited by examiner

*Primary Examiner* — Hung T Vy

(74) *Attorney, Agent, or Firm* — TUCKER ELLIS LLP

(57) ABSTRACT

In accordance with various embodiments, described herein is a system and method for providing a traceable push-based pipeline and monitoring of data quality in extract, transform, load or other enterprise computing environments. The system can include a combination of features including one or more of: an end-to-end push-based pipeline, which uses task-based events to trigger downstream jobs; the application of a table-of-tables or control table, by which the system can trace with detail the performance of each task and corresponding data table changes; a decoupling of pipeline components across several dimensions, for example: task, data, role, and/or time; a user interface or dashboard for monitoring pipeline health or data quality over the pipeline components and dimensions; and an orchestrator that can learn from pipeline health data and task/table changes, and identify actual or potential issues involving the pipeline, including associated root causes.

20 Claims, 14 Drawing Sheets

SYSTEM AND METHOD FOR TRACEABLE PUSH-BASED ETL PIPELINE AND MONITORING OF DATA QUALITY IN ETL ENVIRONMENTS

CLAIM OF PRIORITY

This application is a continuation of U.S. Patent Application titled "SYSTEM AND METHOD FOR TRACEABLE PUSH-BASED ETL PIPELINE AND MONITORING OF DATA QUALITY IN ETL ENVIRONMENTS", application Ser. No. 18/236,214, filed on Aug. 21, 2023; which application and the contents thereof are herein incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to enterprise computing environments that use extract, transform, load processes, and are particularly directed to systems and methods for providing a traceable push-based pipeline and monitoring of data quality in such environments.

BACKGROUND

An enterprise computing environment may include the use of extract, transform, load (ETL) processes that operate as data processing pipelines to extract data from one or more data sources, transform the data as needed, and load the transformed data into a data store such as a database or data warehouse, for subsequent usage, for example to generate data analytics or visualizations, or to support other types of applications.

An ETL pipeline can include various components that operate within or as part of the pipeline, to support data ingestion, data processing, and data visualization.

Some ETL pipelines operate in a pull-based manner, executing jobs on a daily or other fixed schedule, to load and process the data. However, when scheduled jobs fail, for example if a source data is determined to be missing a particular set of data, then a system administrator may need to manually review the ETL logs and trigger the pipeline to back-fill the missing data.

The challenges associated with manually tracing a pull-based ETL process, for example as tables of data change during the execution of the ETL process, presents difficulties in troubleshooting, scalability, and integration or testing of new pipeline features.

SUMMARY

In accordance with various embodiments, described herein is a system and method for providing a traceable push-based pipeline and monitoring of data quality in extract, transform, load or other enterprise computing environments.

The system can include a combination of features including one or more of: an end-to-end push-based pipeline, which uses task-based events to trigger downstream jobs; the application of a table-of-tables or control table, by which the system can trace with detail the performance of each task and corresponding data table changes; a decoupling of pipeline components across several dimensions, for example: task, data, role, and/or time; a user interface or dashboard for monitoring pipeline health or data quality over the pipeline components and dimensions; and an orchestrator that can learn from pipeline health data and task/table changes, and identify actual or potential issues involving the pipeline, including associated root causes.

For example, in accordance with an embodiment, the described approach allows an orchestrator to monitor a pipeline along its task/data/time dimensions, determine which particular tasks should be run in the event of pipeline-associated errors, and then run those tasks to automatically recover from the errors.

At the same time, the orchestrator or another monitoring component can report metrics on the pipeline performance/health, including the various tasks associated with the pipeline, and similarly by task/data/time dimensions-which can be used to guide further improvement of the design and/or operation of the pipeline or tasks as desired.

DETAILED DESCRIPTION

Figure 1:
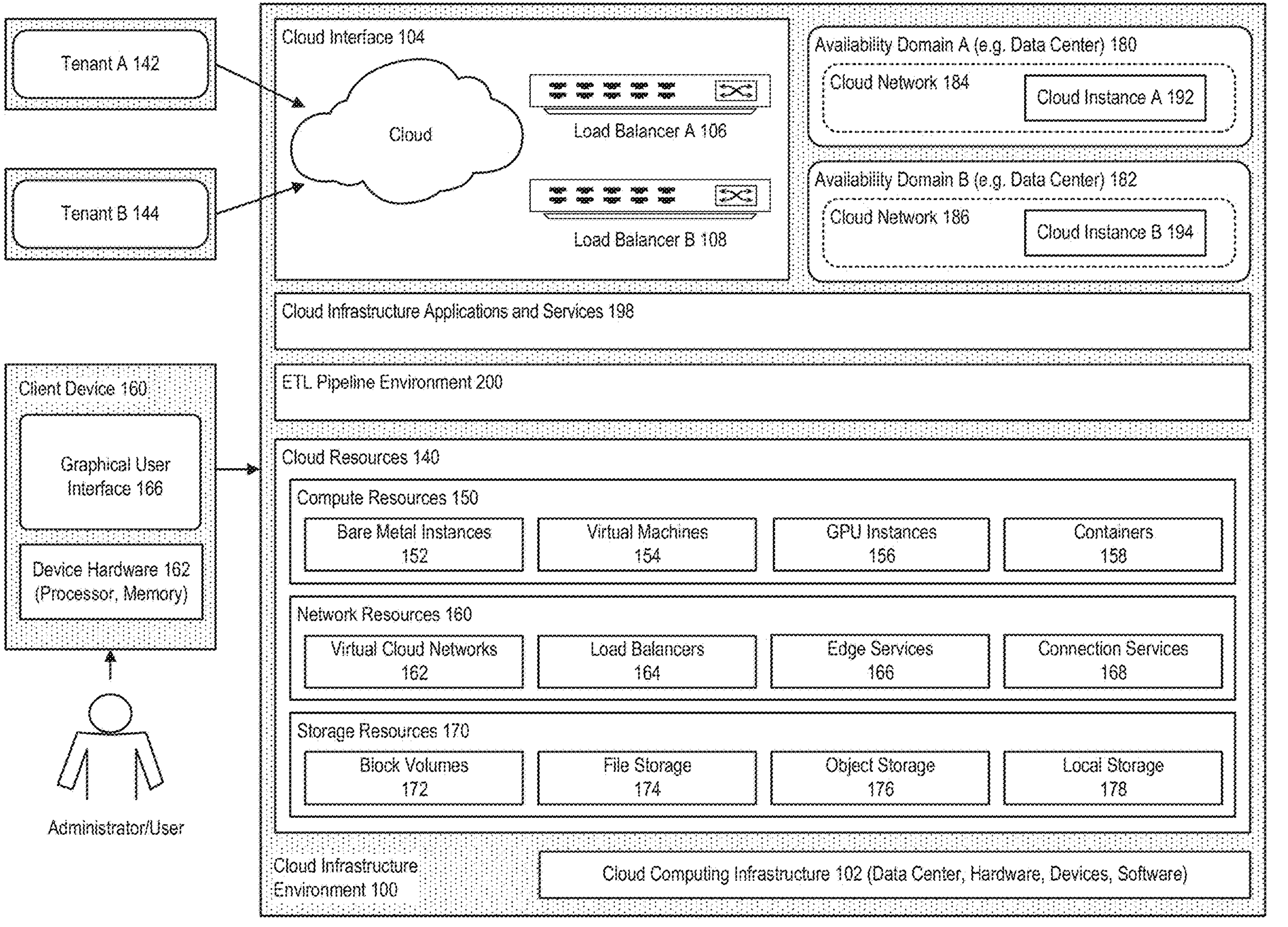
FIG. 1 illustrates an example system which can use an ETL process or pipeline, in accordance with an embodiment.

An enterprise computing environment may include the use of extract, transform, load (ETL) processes that operate as data processing pipelines to extract data from one or more data sources, transform the data as needed, and load the transformed data into a data store such as a database or data warehouse, for subsequent usage, for example to generate data analytics or visualizations, or to support other types of applications.

An ETL pipeline can include various components that operate within or as part of the pipeline, to support data ingestion, data processing, and data visualization. Some ETL pipelines operate in a pull-based manner, executing jobs on a daily or other fixed schedule, to load and process the data. However, when scheduled jobs fail, for example if a source data is determined to be missing a particular set of data, then a system administrator may need to manually review the ETL logs and trigger the pipeline to back-fill the missing data.

The challenges associated with manually tracing a pull-based ETL process, for example as tables of data change during the execution of the ETL process, presents difficulties in troubleshooting, scalability, and integration or testing of new pipeline features.

Data Platform Pipelines

In accordance with an embodiment, a data processing pipeline as may be used in a cloud computing or enterprise computing environment, comprises several components that provide, for example: raw data ingestion from an enterprise computing system; initial data processing; ETL or data ingestion to a database, data warehouse, or data mart; and data visualization, for example to provide analytical information based on the data.

Such a pipeline may operate with pull-based or fixed scheduling, to run daily jobs to load, process, ETL and save data. However, when scheduled jobs fail, then a system administrator may need to manually review the ETL logs and trigger the pipeline to back-fill the missing data. Although a data integration service can be used to build dependency between jobs; when ETL jobs are pull-based and implemented with a fixed scheduler, then no knowledge is transferred to the resultant database, data warehouse, or data mart when the upstream fails.

Additional challenges associated with a pull-based ETL approach include: the use of pull-based ETL processes in data marts can result in unnecessary false alarms in the event of upstream process failure; the system does not trace all table change history, especially for core dimensions (DIM), which can result in potential data inconsistency and difficulty in troubleshooting; pipeline health and performance statistic data is not collected and reported; the tight coupling in the pipeline for pre-check, processing and validation, results in difficulty in scalability and new feature integration/testing; and the approach does not lend itself to operation orchestration which can learn, identify scenario, and automatically run fix-up jobs.

Pipeline Data Quality Monitoring

In accordance with various embodiments, described herein is a system and method for providing a traceable push-based pipeline and monitoring of data quality in extract, transform, load or other enterprise computing environments. The system can include a combination of features including one or more of:

(1) An end-to-end push-based pipeline, which uses task-based events to trigger downstream jobs. For example, the system can adapt to or operate with existing pipeline platforms, with minimal changes to the interfaces or other operational aspects of those platforms.

(2) The application of a table-of-tables or control table, by which the system can trace with detail the performance of each task and corresponding data table changes. For example, the described approach can be used to identify a root cause quickly when problems arise or in troubleshooting.

(3) A decoupling of pipeline components across several dimensions, for example: task, data, role, and time. For example, this enables the system to determine when to run which task, and how the task changes the data state. The described approach can also be used to remove the tight-coupling typically found in ETL environments and develop new jobs and features for reuse and scale purposes.

(4) A user interface or dashboard for monitoring pipeline health or data quality over the pipeline components and dimensions. For example, the system can automatically track each job performance in the pipeline statistically, including for example service level agreement (SLA) availability updates for each level of granularity (for example, daily, weekly, monthly), and provide insights on where the pipeline can improve.

(5) An orchestrator that can learn from pipeline health data and task/table changes and identify actual or potential issues involving the pipeline, including associated root causes. For example, the described approach can be used to identify repeated pipeline issues with root causes, help ETL teams with creating a new job, or automating one or more jobs for backfill, error fixing, or quality validations.

In accordance with various embodiments, the system can include or utilize some or all of the following features:

ETL: an extract, transform, load (ETL) process whereby data is extracted, transformed (e.g., cleaned, sanitized, scrubbed), and loaded into an output data container.

Job: a pipeline can be associated with one or more jobs that comprises one or more tasks. Different jobs may serve different goals, and run in sequence or parallel, based on configuration.

Task: a task is associated with a program or process operating within or as part of a pipeline and serving a particular data function, for example, data loading, processing, SQL query, scheduler, pre-check, or validation.

Task State Table: a data representation or table that traces task state and time associated with one or more jobs.

Data Change Table: a data representation or table that traces data change state and time in the various components that operate within or as part of the pipeline, for example, data ingestion or data processing components, to indicate a success, partial, or failure.

Table Change: as jobs execute, the system can trace each table change history, for example in a data store such as a database or data warehouse, or for example, as a data mart.

Schema Change Table: as jobs execute, the system can trace historical schema change for a table.

Dependency Table: as jobs execute, the system can include a data representation or table that defines upstream and downstream dependency between tasks.

ADW: an Autonomous Data Warehouse instance.

Source Table: tables of data provided in a data store such as a database or data warehouse.

Dimension Table: a dimension table that has the same meaning and content when being referred from different places. (e.g., as a conformed date dimension, conformed product/service dimension, or conformed customer/tenant).

Slowly Changing Dimension: a dimension that stores and manages both current and historical data over time in a data warehouse.

Staging Environment: tables containing the history tables for the usage of tracking table changes and providing tables for different dates.

Dependency scheduler: a scheduler tool for use with a data store such as a database or data warehouse.

Oracle Database Built in Scheduler: a schedule packager (DBMS_SCHEDULER) which provides a collection of scheduling functions and procedures that are callable from PL/SQL programs.

PII: a personally-identifiable information.

Cloud Infrastructure Environments

Figure 2:
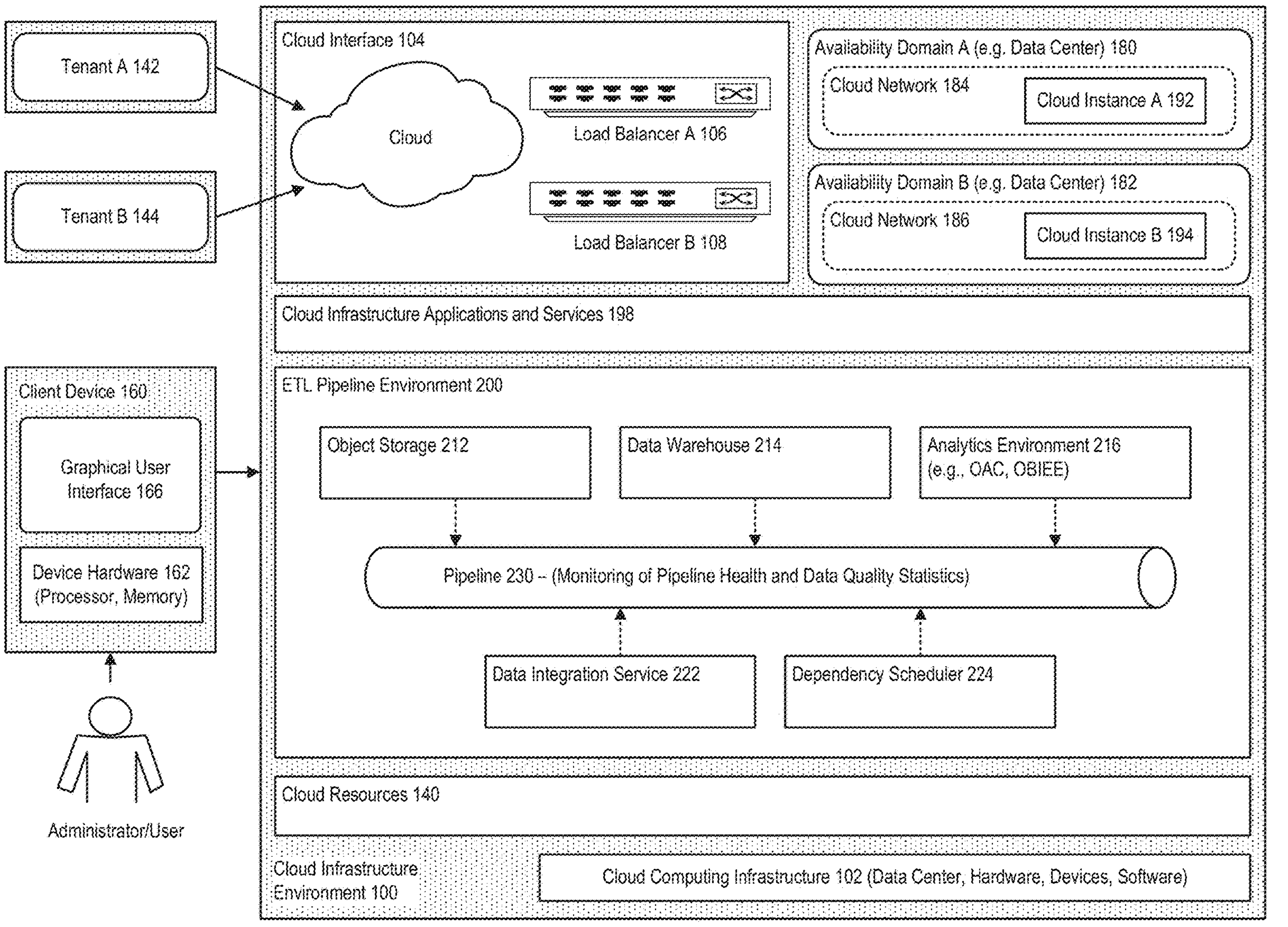
FIG. 2 further illustrates an example system which can use an ETL process or pipeline, in accordance with an embodiment.

FIGS. 1 and 2 illustrate an example system which can use an ETL process or pipeline, in accordance with an embodiment.

In accordance with an embodiment, the illustrated example is provided for the purpose of illustrating a cloud infrastructure environment, cloud computing, or enterprise computing environment which can use an ETL process or pipeline.

In accordance with other embodiments, the various components, processes, and features described herein can be used with other types of cloud computing environments, and can be provided as software or program code executable by a computer system or other type of processing device, for example a cloud computing system.

For example, as illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108.

In accordance with an embodiment, the cloud infrastructure environment supports the use of availability domains, such as, for example, availability domains A 180, and availability domains A B 182, which enables customers to create and access cloud networks 184, 186, and run cloud instances A 192, B 194.

In accordance with an embodiment, a tenancy can be created for each cloud tenant/customer, for example tenant A 142, B 144, which provides a secure and isolated partition within the cloud infrastructure environment within which the customer can create, organize, and administer their cloud resources. A cloud tenant/customer can access an availability domain and a cloud network to access each of their cloud instances.

In accordance with an embodiment, a client device, such as, for example, a computing device 160 having a device hardware 162 (e.g., processor, memory), and graphical user interface 166, can enable an administrator other user to communicate with the cloud infrastructure environment via a network such as, for example, a wide area network, local area network, or the Internet, to create or update cloud services.

In accordance with an embodiment, the cloud infrastructure environment provides access to shared cloud resources 140 via, for example, a compute resources layer 150, a network resources layer 160, and/or a storage resources layer 170. Customers can launch cloud instances as needed, to meet compute and application requirements. After a customer provisions and launches a cloud instance, the provisioned cloud instance can be accessed from, for example, a client device.

In accordance with an embodiment, the compute resources layer can comprise resources, such as, for example, bare metal cloud instances 152, virtual machines 154, graphical processing unit (GPU) compute cloud instances 156, and/or containers 158. The compute resources layer can be used to, for example, provision and manage bare metal compute cloud instances, or provision cloud instances as needed to deploy and run applications, as in an on-premises data center. For example, in accordance with an embodiment, the cloud infrastructure environment can provide control of physical host (bare metal) machines within the compute resources layer, which run as compute cloud instances directly on bare metal servers, without a hypervisor.

In accordance with an embodiment, the cloud infrastructure environment can also provide control of virtual machines within the compute resources layer, which can be launched, for example, from an image, wherein the types and quantities of resources available to a virtual machine cloud instance can be determined, for example, based upon the image that the virtual machine was launched from.

In accordance with an embodiment, the network resources layer can comprise one or more network-related resources, such as, for example, virtual cloud networks (VCNs) 162, load balancers 164, edge services 166, and/or connection services 168.

In accordance with an embodiment, the storage resources layer can comprise one or more resources, such as, for example, data/block volumes 172, file storage 174, object storage 176, and/or local storage 178.

In accordance with an embodiment, the cloud infrastructure environment can include a range of complementary cloud-based components, for example as cloud infrastructure applications and services 198, together with an ETL pipeline environment 200, as further described below.

ETL Pipeline Environments

Figure 3:
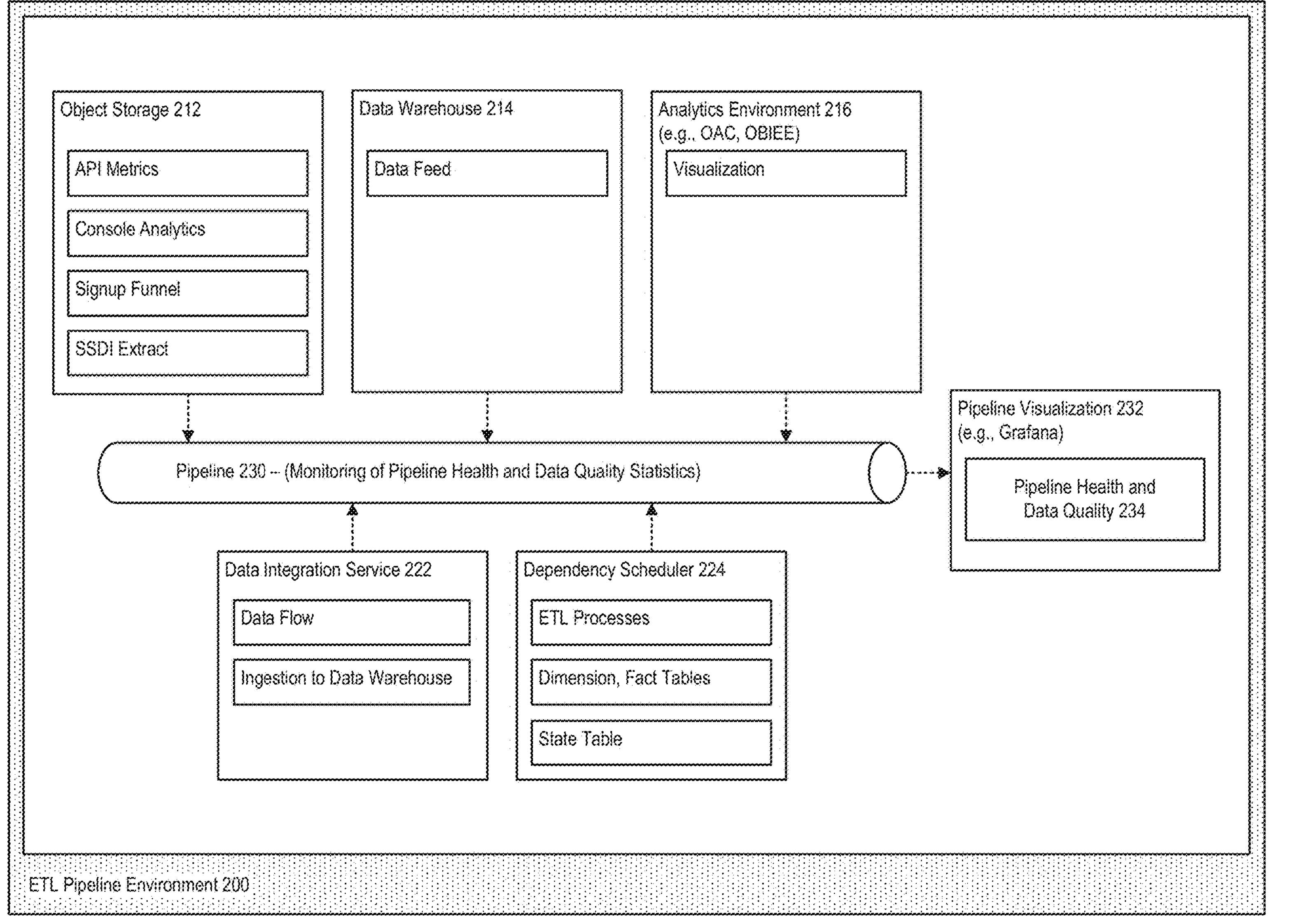
FIG. 3 illustrates a system for providing a traceable push-based pipeline and monitoring of data quality, in accordance with an embodiment.

FIG. 3 illustrates a system for providing a traceable push-based pipeline and monitoring of data quality, in accordance with an embodiment.

As illustrated in FIG. 3, in accordance with an embodiment, an ETL pipeline environment can be provided, for example, as part of a data warehouse, or data analytics environment, for use in processing data and providing analytical information, for example to an internal engineering team or administrator for purposes of managing the pipeline, or to a customer for their further usage.

In accordance with an embodiment, data can be stored within an object storage component 212, which can be provided for example as a cloud infrastructure environment or service, as described above.

In accordance with an embodiment, a data integration service 222 can read or ingest data from object storage and push it to a data warehouse instance 214, for further processing. Examples of such data warehouse include Oracle Autonomous Data Warehouse.

In accordance with an embodiment, a dependency scheduler 224 can be used to automate the ETL processes to run at a particular cadence, for example to read the data at a particular time, perform some ETL processing, and log events, metrics, and validation checks, and report any anomalies within the data.

In accordance with an embodiment, such information can be provided to an analytics environment 216, for example Oracle Analytics Cloud (OAC), or Oracle Business Intelligence Enterprise Edition (OBIEE), for purposes of generating data visualizations or other analytical information associated with the data.

In accordance with an embodiment, a pipeline visualization component 232, for example a Grafana instance, can provide an indication as to the pipeline health and quality 234, for example within a dashboard or other graphical user interface.

As illustrated, within the pipeline 230, each of the data ingestion, processing, and visualization aspects are automated, such that the pipeline health and quality information provided to a user reflects the health of the pipeline as it executes, from the initial ingestion of data from object storage through to the visualization of the associated data analytics.

When a problem occurs, for example, the pipeline is expected to operate according to a daily cadence and yet the system may not receive data for a particular day, the system will understand which information is missing and work itself to obtain the missing data. The system can then restart the entire pipeline, and in the event manual (human) intervention is needed, inform the appropriate engineering team or administrator.

However, when an ETL pipeline environment operates in a pull-based manner, then each step in the pipeline process relies on the previous step, and automatically starts when the previous step has completed. When a particular cadence is used, for example to read the data at a particular time, then tracing and accommodating pipeline issues becomes difficult.

Figure 4:
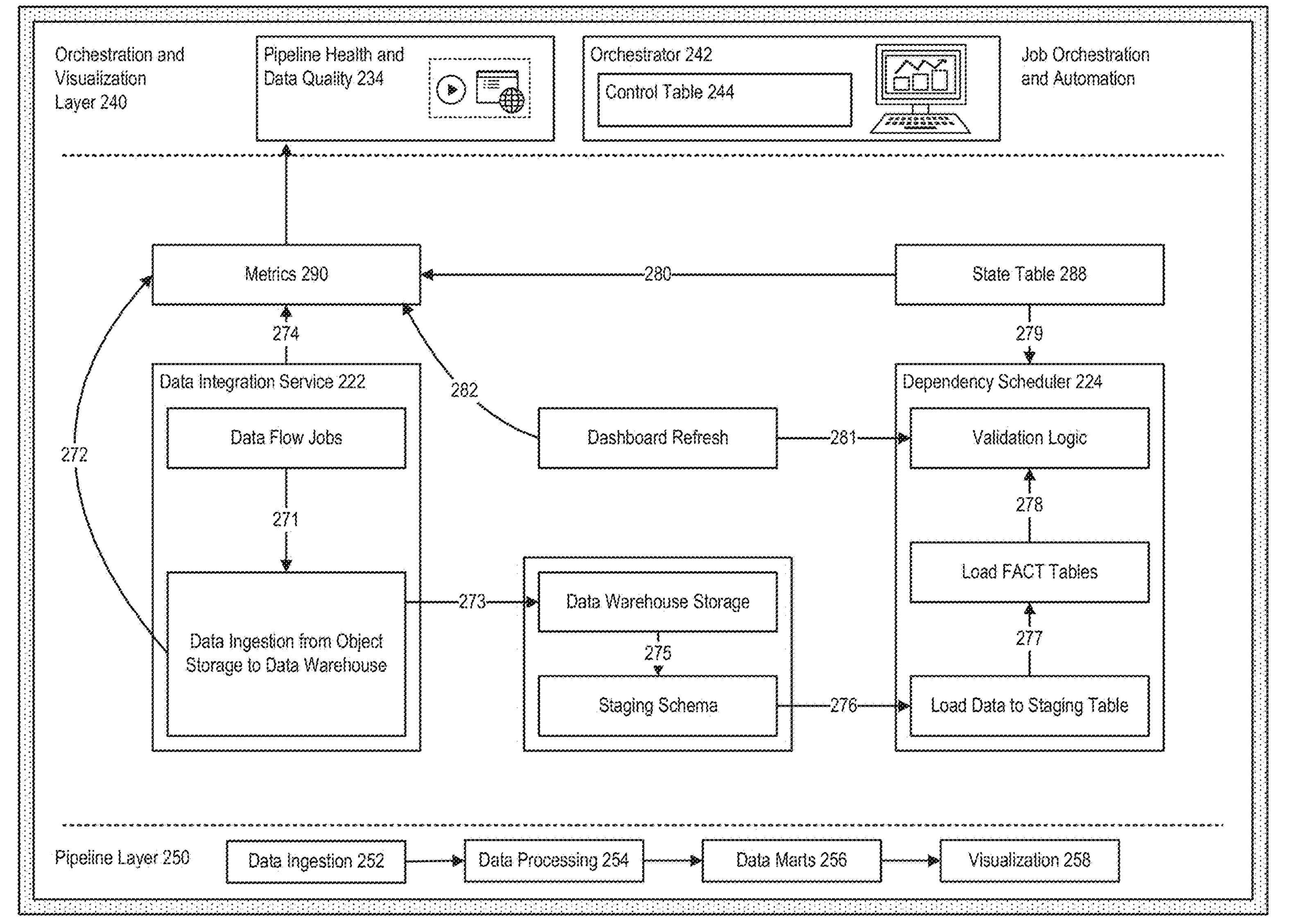
FIG. 4 further illustrates a system for providing a traceable push-based pipeline and monitoring of data quality, in accordance with an embodiment.

FIG. 4 further illustrates a system for providing a traceable push-based pipeline and monitoring of data quality, in accordance with an embodiment.

As illustrated in FIG. 4, the system can include an orchestration and visualization layer 240, which includes an orchestrator 242 operating according to a table-of-tables or control table 244 and providing access to a pipeline health and data quality for purposes of job orchestration and automation.

As illustrated in FIG. 4, a pipeline layer 250 can include various pipeline components that handle data ingestion 252, data processing 254, data marts 256, and data visualization 260.

In accordance with an embodiment, an example push-based pipeline process can include various steps, such as:

At 271, a data flow job is triggered, and data is ingested, for example from a customer's enterprise computing system to an object storage bucket. The data flow job can be triggered by the data integration service at a scheduled time.

At 272, metrics associated with the ingestion of the data, for example an indication of number of files that have been ingested to a data warehouse feed, are reported as telemetric information or metrics, for subsequent use in assessing the pipeline health and data quality.

At 273, data is ingested from an (e.g., udxanalyticsdev) object-storage bucket and ingested to a data warehouse object-storage bucket.

AT 274, a data integration service emits metrics on the health of pipeline; the pipeline here is a sequence of data flow job and data ingestion steps.

At 275, based on the cadence configured in the data warehouse feed, data is loaded to a schema (e.g., a UDXA_STG schema).

At 276, an ETL process is triggered automatically to load data into a (e.g., UDXA Prod) dimension table, using the dependency scheduler.

At 277, the ETL process loads the data to consecutive fact tables stored at the data warehouse. The status of each data load and ETL run status, and a dependency table information is updated in a state table, and the information in the state table is emitted as status or telemetry information.

At 278, a validation logic package is triggered to validate the data before it is accessed by an analytics environment (e.g., OAC) dashboard, again using the dependency scheduler.

At 279, the status of the data load and ETL run status, and dependency table information, is updated in the state table.

At 280, the information in the state table is emitted as telemetric information or metrics.

At 281, an orchestrator having a user interface or dashboard, for use in monitoring and displaying pipeline health, pulls data from the various tables on a periodic basis; and at 282 a dashboard refresh status is emitted as telemetric information or metrics 290, for subsequent use in assessing the pipeline health and data quality.

In accordance with an embodiment, an advantage of using a table-of-tables or control table is that it provides information and a means of assessing how each pipeline task is operating, for example based on the time that it took for that task to complete or how many resources it utilized in completing that task.

Such information can be used to guide scaling of the data flow, and/or to improve the operation of the pipeline. The information received can also be used, for example, to determine to allocate more resources for use with one or more components of the pipeline. The control table also provides an understanding of how the system is operating with detailed granularity, which is useful when problems occur in determining a root cause of the problem.

Figure 5:
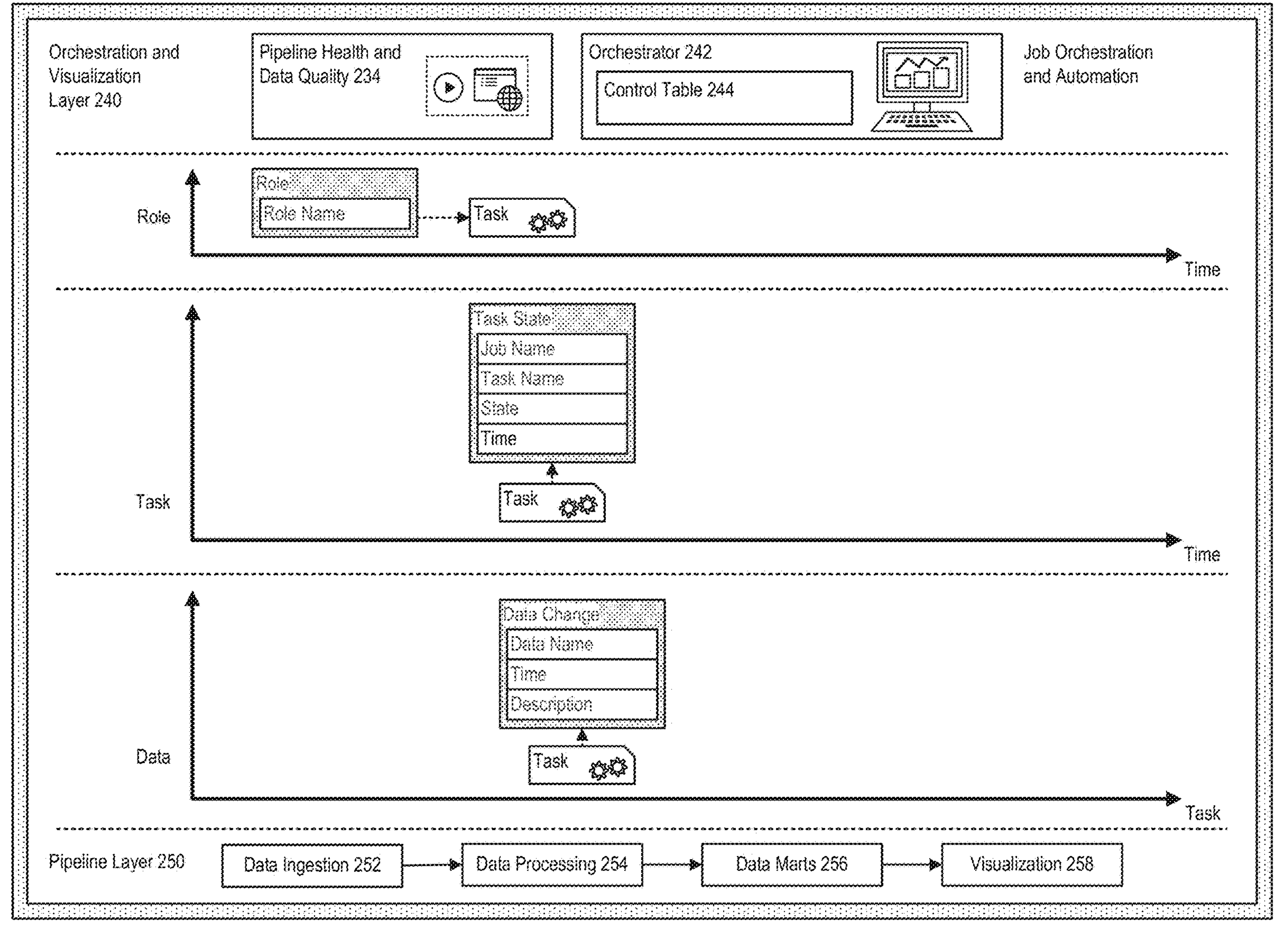
FIG. 5 illustrates monitoring of a pipeline data quality over multiple dimensions, in accordance with an embodiment.
Figure 6:
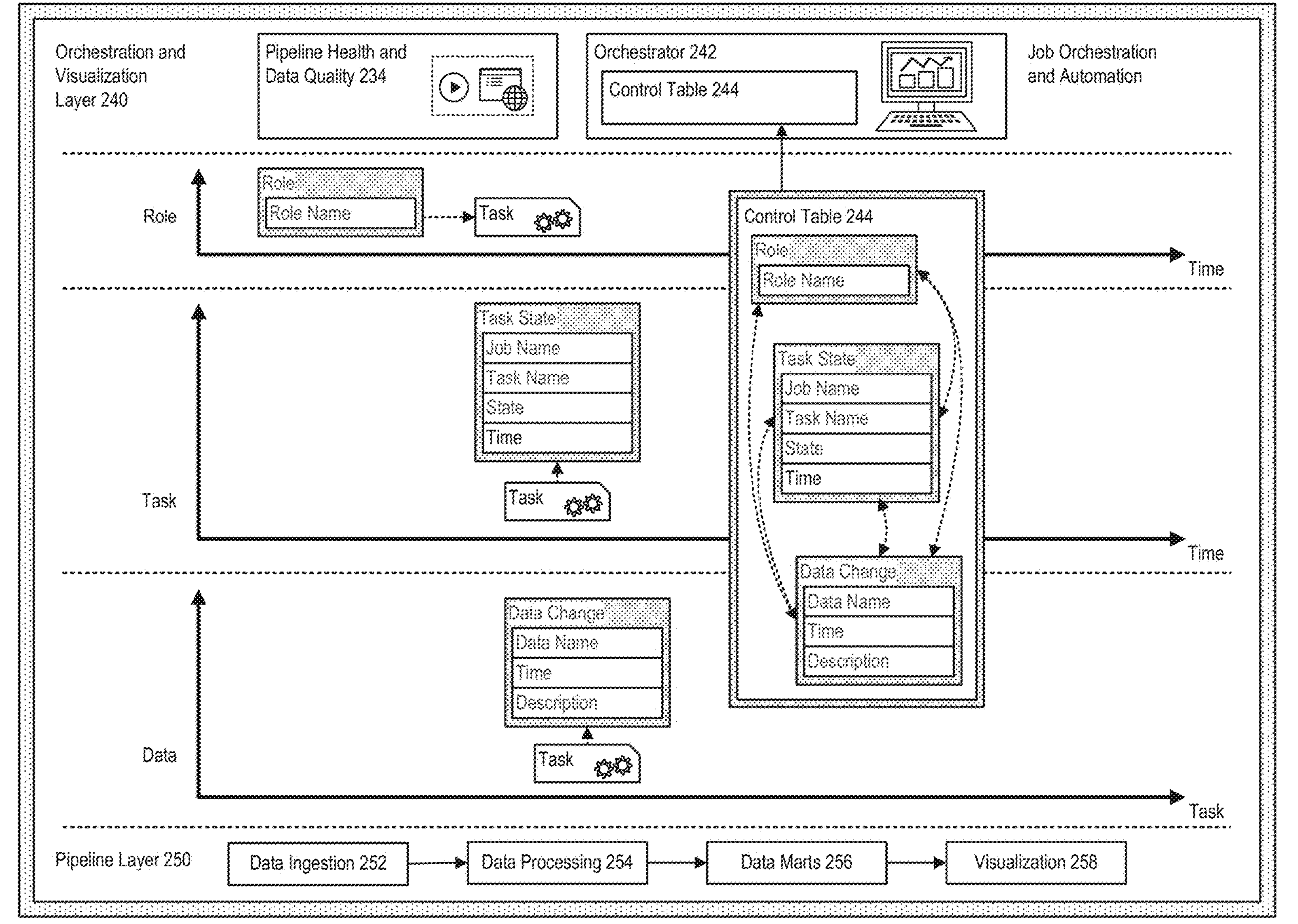
FIG. 6 further illustrates monitoring of a pipeline data quality over multiple dimensions, in accordance with an embodiment.
Figure 7:
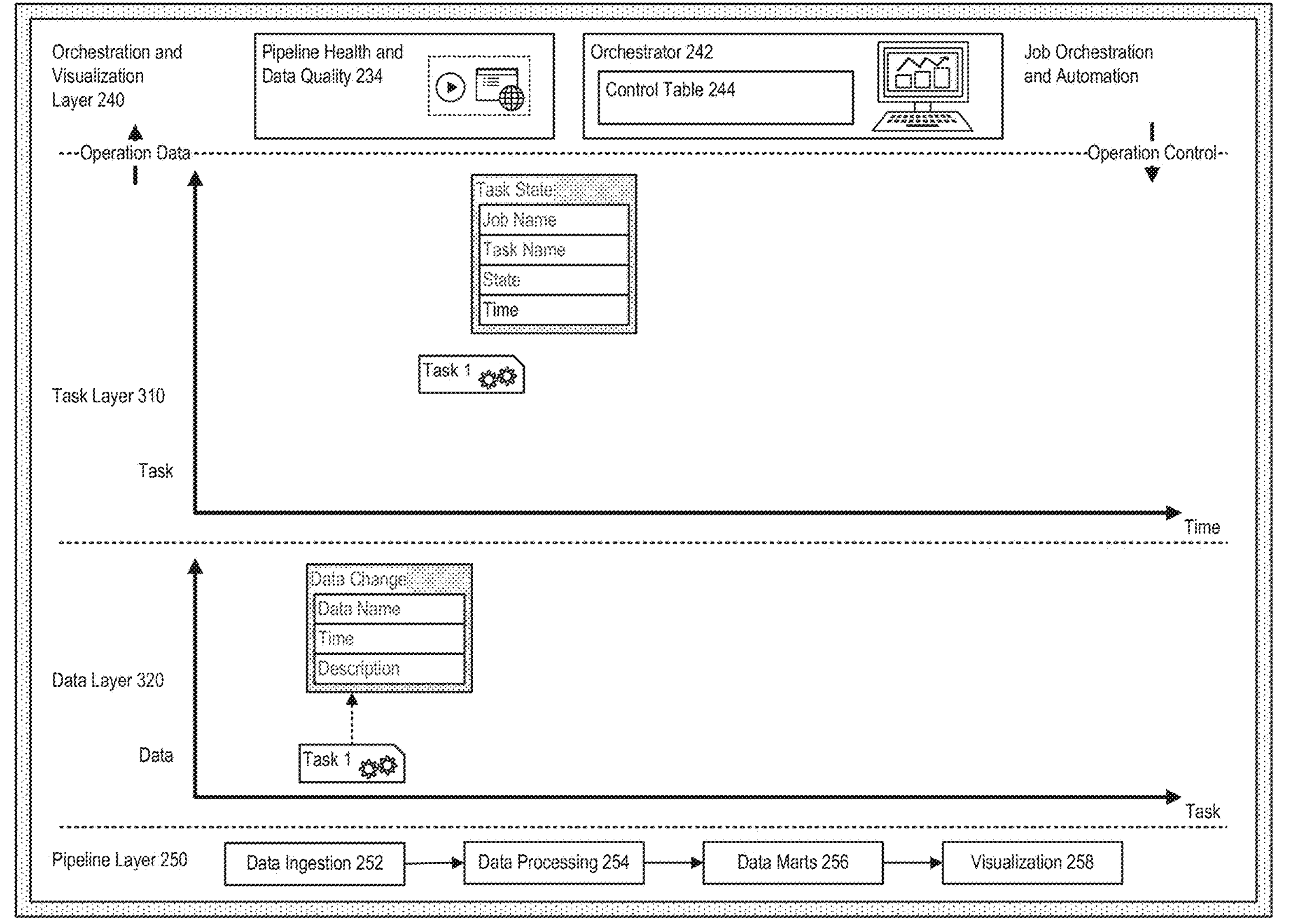
FIG. 7 illustrates an example use of the system to provide monitoring of a pipeline data quality, in accordance with an embodiment.
Figure 8:
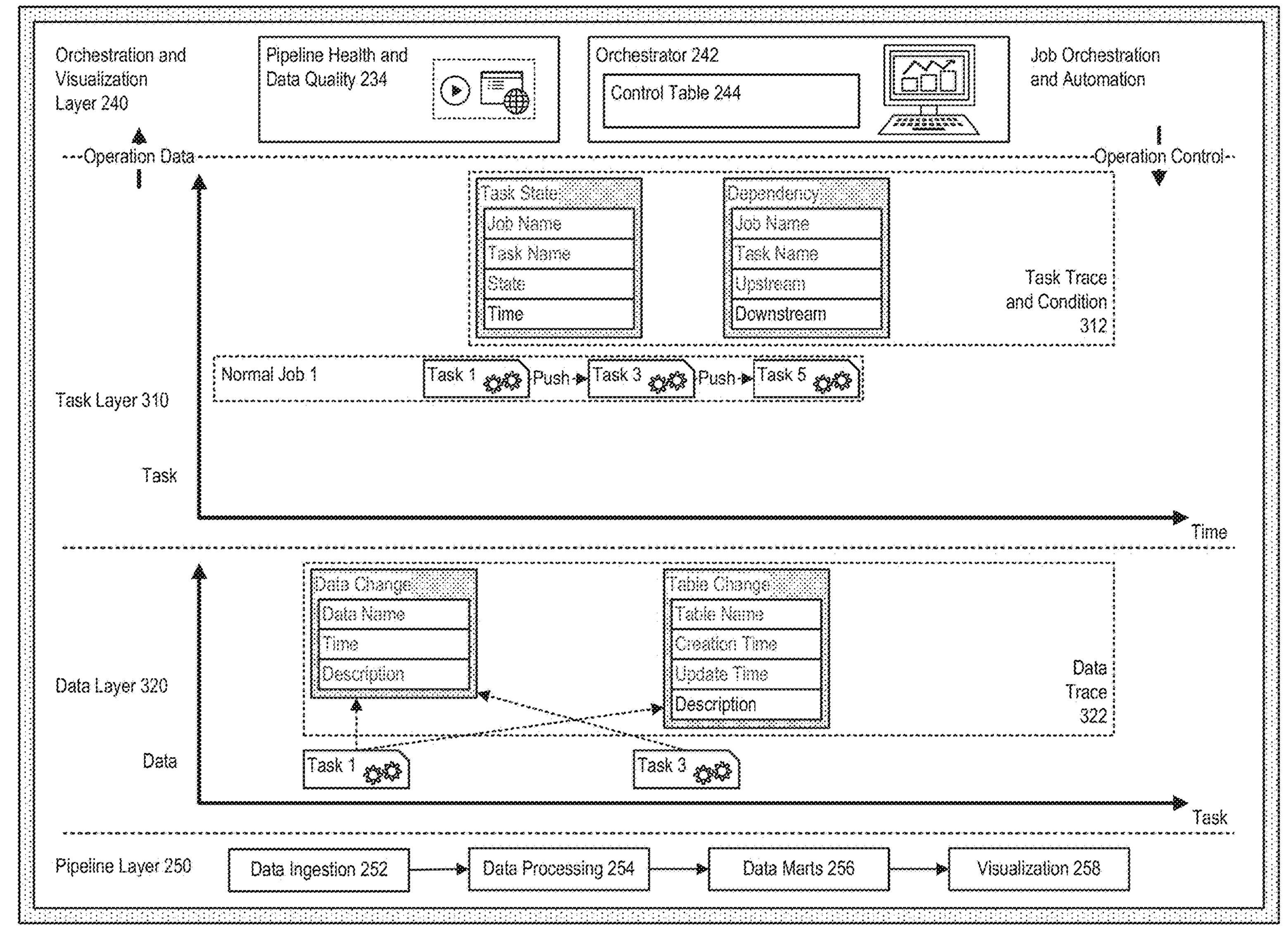
FIG. 8 further illustrates an example use of the system to provide monitoring of a pipeline data quality, in accordance with an embodiment.
Figure 9:
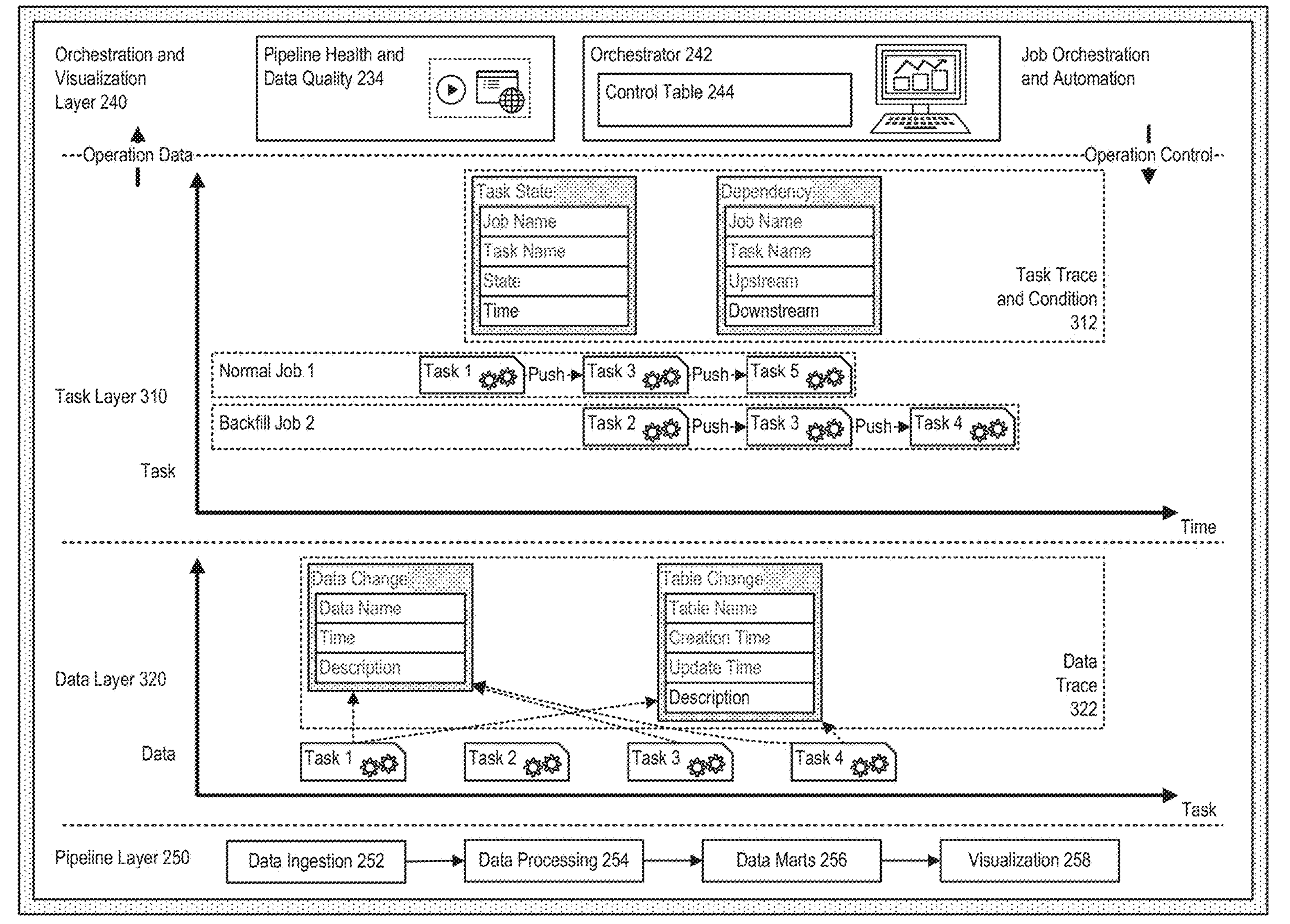
FIG. 9 further illustrates an example use of the system to provide monitoring of a pipeline data quality, in accordance with an embodiment.
Figure 10:
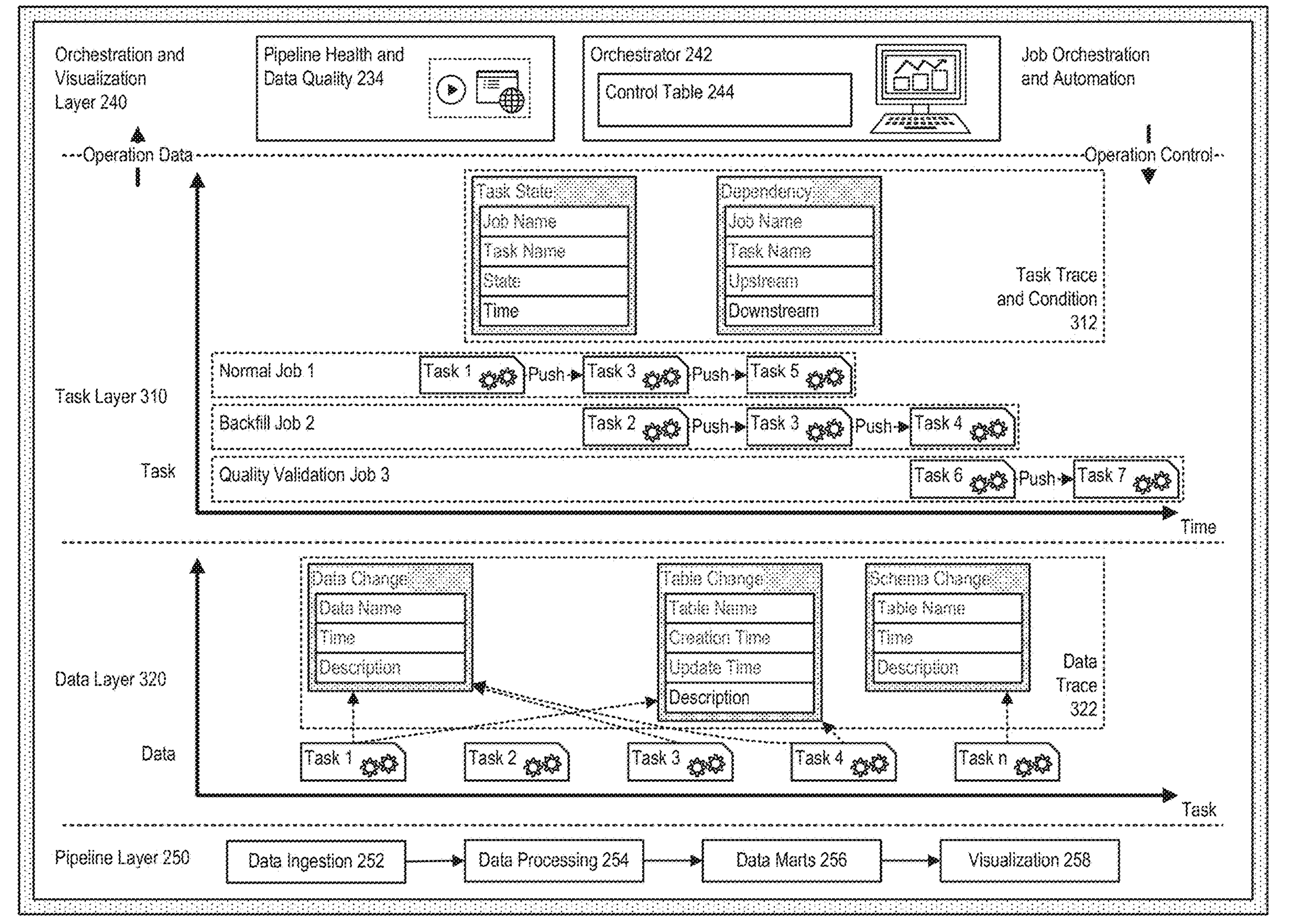
FIG. 10 further illustrates an example use of the system to provide monitoring of a pipeline data quality, in accordance with an embodiment.

FIGS. 5-6 illustrate monitoring of a pipeline data quality over multiple dimensions, in accordance with an embodiment.

Generally described, in accordance with an embodiment, the approach includes: providing an extract, transform, load (ETL) push-based pipeline that operates to extract data from one or more data sources, transform the data as needed, and load the transformed data into a data store, for subsequent usage; a data layer that operates to trace one or more task's impact on a data level; a task layer that operates, when the system runs a particular job, to define task sequence and dependency and which uses a task state table or event to trigger downstream jobs; and an orchestrator that operates to build job orchestration rules and maintain a pipeline performance dashboard or visualization.

In accordance with an embodiment, the pipeline includes one or more data ingestion or data processing components and is associated with one or more jobs that comprises one or more tasks, wherein a task is associated with a program or process operating within or as part of a pipeline and serving a particular data function.

In accordance with an embodiment, the pipeline components are decoupled over multiple dimensions, including task, data, role, and time, wherein the system maintains a table-of-tables or control table, which the system uses to: trace task performance and detailed data and table changes as the pipeline executes, determine when to run a particular task and how the task changes the data state, and report a status or telemetry information to the orchestrator.

As illustrated in FIGS. 5-6, in accordance with an embodiment, the system operates over a plurality of layers, including for example: a pipeline layer, a data layer, a task layer, and an orchestration and visualization layer.

In accordance with an embodiment, the pipeline layer operates as a push-based pipeline, to extract data from one or more data sources, transform the data as needed, and load the transformed data into a data store such as a database or data warehouse, for subsequent usage, for example to generate data analytics or visualizations, or support other types of applications.

In accordance with an embodiment, the pipeline can include or encompass various components that operate within or as part of the pipeline, for example to support raw data ingestion, data processing, data ingestion to a data warehouse or data mart, and data visualization.

In accordance with an embodiment, the data layer operates to trace each of one or more task's impact on a data level, such as, for example, source data change, data flow state, table change, schema change.

In accordance with an embodiment, the task layer operates, when the system runs a particular job associated with a pipeline (for example, a console analytics pipeline), to define task sequence and dependency. For example, if the system determines that one or more upstream operations have failed, then the system can determine that an associated downstream job will not trigger. The task layer also operates to track each job and each task state, which effectively provides the system with an intelligence describing the pipeline status, including to the orchestrator on what needs to be performed next.

In accordance with an embodiment, the orchestrator operates to build job orchestration rules (i.e., logic) and maintain a pipeline performance dashboard or visualization, which helps the system (or system operator) to identify repeated pipeline issues, and/or trigger automation as appropriate.

In accordance with an embodiment, during processing of an ETL pipeline, the system operates to collect information for task and data, using a table-of-tables or control table, and push that information over to each pipeline stage.

For example, since there are many tasks which have a dependency sequence on other tasks with time, the task state table and dependency table can be bound with the data change table within a same time window, to provide a real-time assessment of the pipeline. The orchestrator can then use the table-of-tables or control table—based for example on an assessment of the task state table, data change table and/or schema change table—to make decisions based on a set of conditions.

By leveraging and surfacing health and data quality data to the orchestrator, the described approach allows the operation of the pipeline to be transparent and adaptive. Additionally, the approach can be used to provide an understanding of root cause of errors, reducing unnecessary false alarms, and providing adaptive scheduling and automation for recovery.

For example, during the execution or processing of a pipeline, if an error occurs, the system can automatically identify upstream and downstream steps, together with their results, by referencing (e.g., looking up rows in) a task state table (i.e., to determine what the system did) and a data change table (i.e., to determine the data change or data trace), and then automatically recovering from the error, or surfacing to a user dashboard the health and data quality information to assist their understanding of the error.

Whereas in a traditional or pull-based ETL approach, it may be necessary to manually pull data to address a pipeline error-using the push-based ETL approach as described herein, if the observed data is not as expected, it is easier to investigate which steps in the pipeline should be addressed, including any previous or subsequent steps.

For example, when the pipeline is decoupled across multiple dimensions, such as task and data-change; or role, task and data-change; the system as described herein effectively knows at each task event what the state of the data should be, and can then use the table-of-tables or control table to make decisions to adjust the pipeline if necessary.

Similarly, using the described approach, an operator can quickly determine a condition of the pipeline, and perform associated actions to improve the operation or performance thereof. Based on the information provided by the table-of-tables or control table, the pipeline can be traced back, for example through various days or timelines, to determine potential data errors, and associated task states, and then recover from the error or suggest or provide improvements as necessary.

Example Control Table

In accordance with an embodiment, an example control table, for example as may be used with a software program that controls the data flow based on table of table inputs, such as what happens to task, results, and data change over time, and their correlation, can be illustrated as:

| Condition | Action | Status |
|---|---|---|
| Source data error made by source team, and continue such error for a couple of days. | Once the source team notify the error, the pipeline can trace back the time length (window) of error, and then search related task state table, and dependency table (task layer, then use data change table, and schema change table (data layer in same time window), to recover exact previous correct status automatically. This is feasible since we understand every step details and can "revert" results to a correct state. | Then the whole pipeline recover to previous normal state without any impact from source error, and continue sync with source with the correct data. |
| An error in the pipeline itself; for example, accidently deleting some data in the middle. | Once the error is identified, it is easy for our pipeline to recover original correct data since we have data change table, task table, and dependency. In other words, we can trace back every step through the table-of-tables or control table in different layer. We perform a back-fill automatically to recover all good results. | After this, the pipeline automatically recover from its own errors. |
| Normal case: no source error, no error in the | The orchestrator has a very clear view on system status for task health and | A table-of-tables or control table helps the system trace |

-continued

| Condition | Action | Status |
|---|---|---|
| pipeline itself. | data health, such as how much data changed, frequency, task success rate, latency, task error rate, and so on. | every detail automatically and helps operation efficiency. |

In the illustrated example, various tasks have a dependency on other tasks with time, and result in status in different time periods per different data set.

Considering different conditions, the system can use a task state table and dependency table, bound with a data change table in a same time window, to determine what happened to related data through a task change/data change table.

If an error occurs, the system can automatically identify upstream and downstream steps, together with their results, by looking up rows in the task state table (i.e., to determine what the system did) and the data change table (i.e., to determine the data change or data trace), and then automatically recover from the error.

For example, if one considers the following example task status table:

| Task Name | What task do | Time when it ran |
|---|---|---|
| X | Copy one row to table A | Time 1 |
| Y | Update one row in table B successfully | Time 1 + 2 hour |

And the following example data change table:

| Item | Time | Affected row |
|---|---|---|
| Insert | Time 1 | 23 |
| Delete | Time 2 | 42 {value: [a, b, c]} |

As illustrated by the above example, if the system or an operator determines that the ETL process has mis-deleted row 42, the system can use the data change table and task state table to recover the deleted row in the table which has status before the error-incurring task Y.

FIGS. 7-10 illustrate an example use of the system to provide monitoring of a pipeline data quality, in accordance with an embodiment.

As illustrated in FIGS. 7-10, in accordance with an embodiment, the system operates over a plurality of layers, including for example: a pipeline layer, a data layer 320, a task layer 310, and an orchestration and visualization layer.

In accordance with an embodiment, as described above, the data layer operates to trace each of one or more task's impact on a data level, such as, for example, source data change, data flow state, table change, schema change.

In accordance with an embodiment, as described above, the task layer operates, when the system runs a particular job associated with a pipeline (for example, a console analytics pipeline), to define task sequence and dependency. For example, if the system determines that one or more upstream operations have failed, then the system can determine that an associated downstream job will not trigger. The task layer also operates to track each job and each task state, which effectively provides the system with an intelligence describing the pipeline status. During processing of an ETL pipeline, the system operates to collect information for task and data, through a table-of-tables or control table approach, and push that information over to each pipeline stage.

Since there may be tasks which have a dependency sequence on other tasks with time, the task state table and dependency table can be bound with the data change table within a same time window, to provide a real-time assessment of the pipeline. The orchestrator can then use the table-of-tables or control table to make decisions based on a set of conditions, as reflected in a task trace and condition 312 (i.e., what the system did), and data trace 322 (i.e., the corresponding change in the data).

Figure 11:
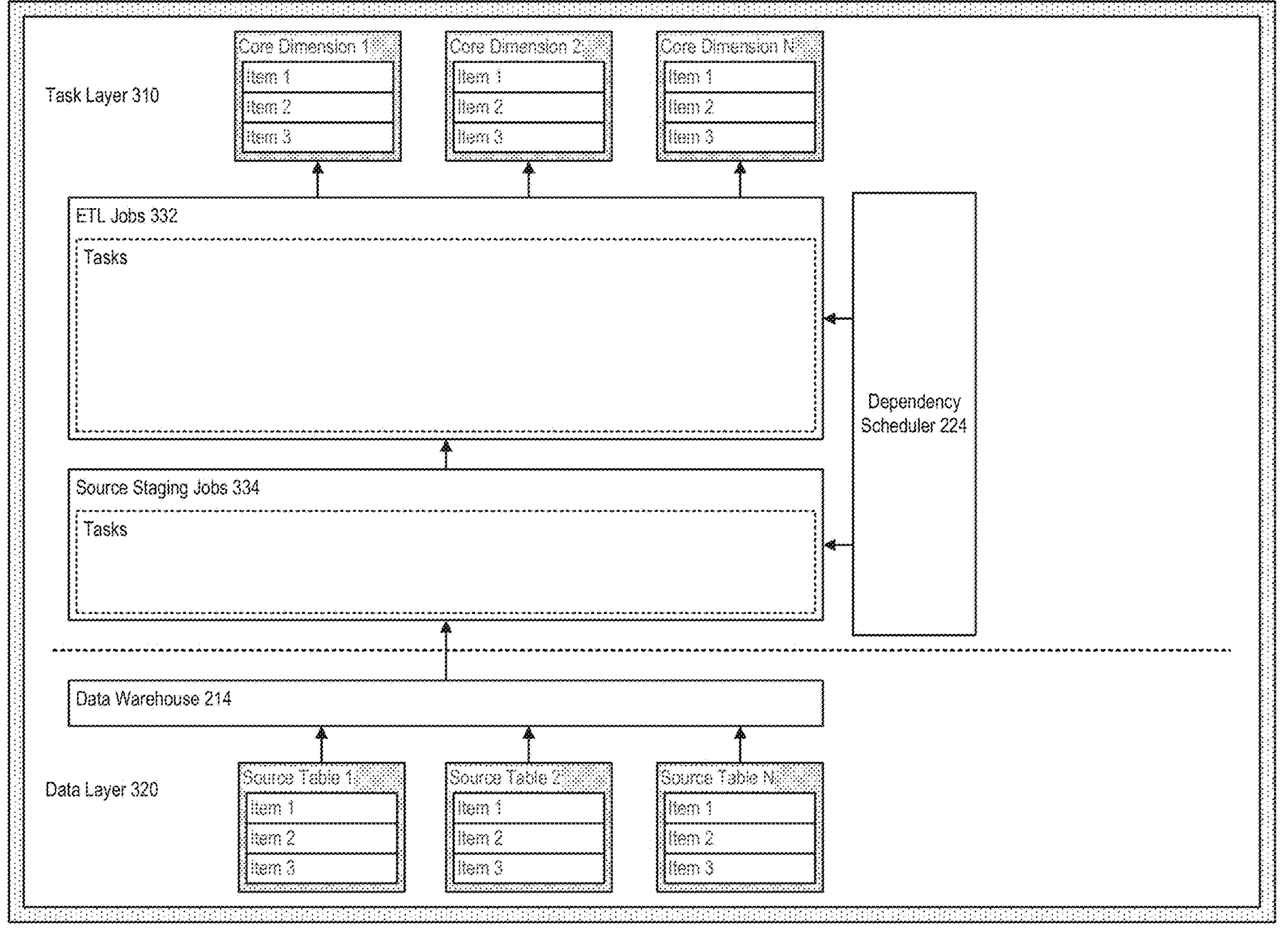
FIG. 11 illustrates an example implementation of using a traceable push-based pipeline with a data analytics environment, in accordance with an embodiment.
Figure 12:
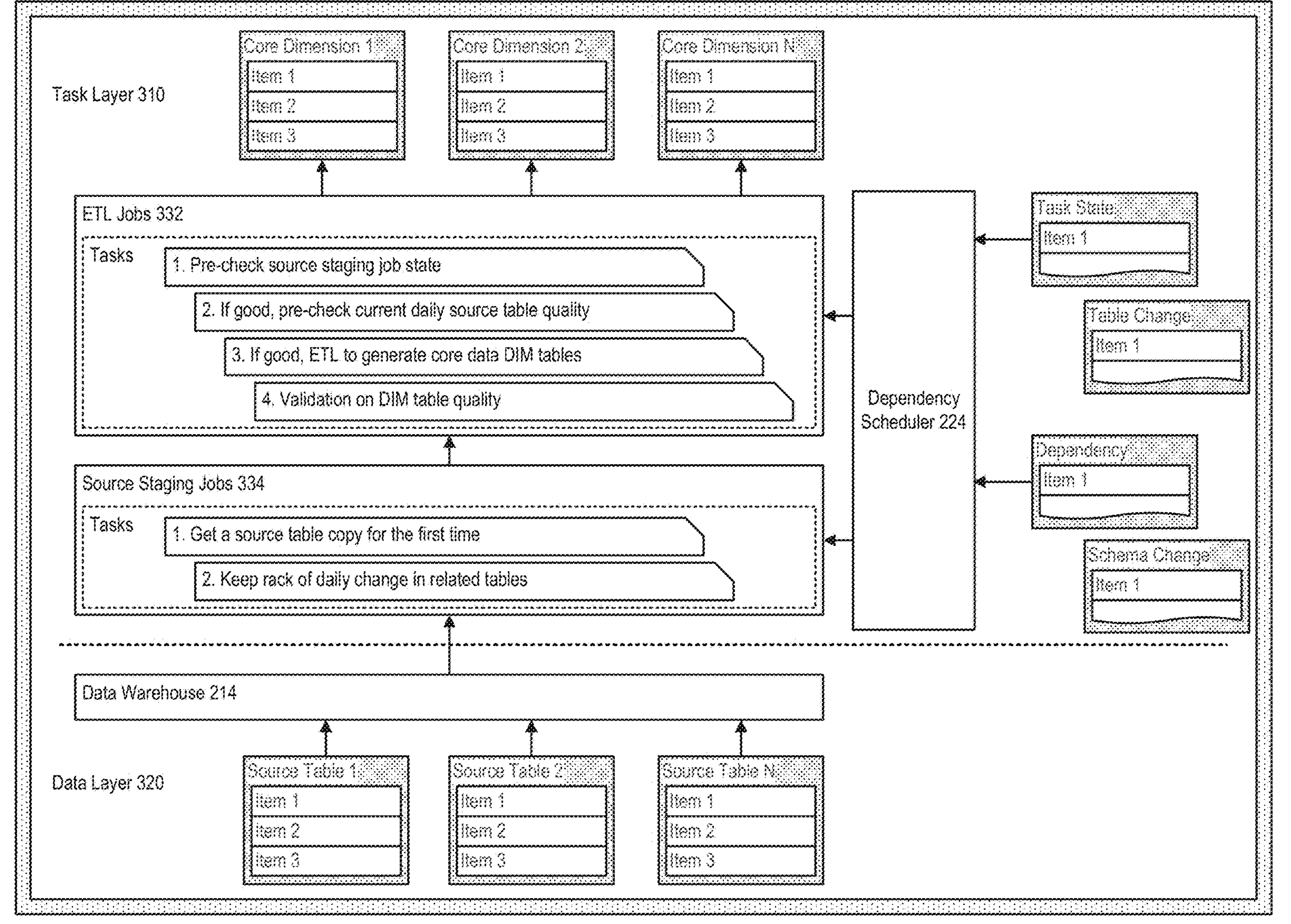
FIG. 12 further illustrates an example implementation of using a traceable push-based pipeline with a data analytics environment, in accordance with an embodiment.
Figure 13:
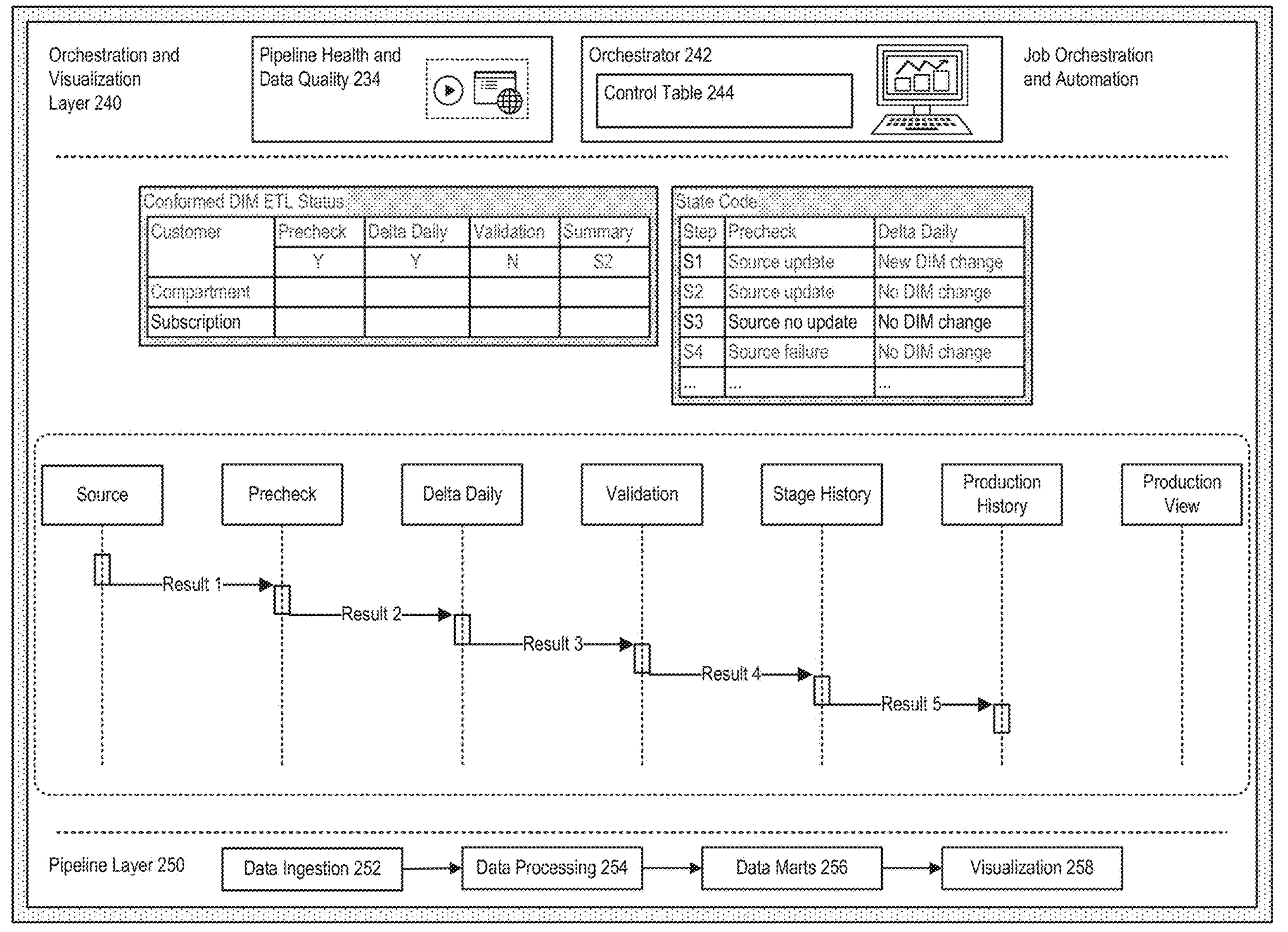
FIG. 13 further illustrates an example implementation of using a traceable push-based pipeline with a data analytics environment, in accordance with an embodiment.

FIGS. 11-13 illustrate an example implementation of using a traceable push-based pipeline with a data analytics environment, in accordance with an embodiment.

In accordance with an embodiment, the approach described herein can be used to provide support for a push-based ETL pipeline, for use with a data warehouse environment in providing data analytics, including, for example:

Monitoring component: a master dashboard which provides operation state at a glance, including a cadence filter (daily, weekly, monthly) in a dashboard which provides statistical information of operation activities, such as for example: customer traffic; data-processing health (success/failure count); ETL jobs health; OAC dashboard health status; total processing time of each pipeline; security central tickets. The monitoring component can include a health dashboard which contains links to other dashboards as well as the health status, for example loaded, delayed, error, broken, etc.

Data warehouse component: a push-based pipeline which operates as a series of ETL jobs, with each job triggered upon completion of its predecessor, and which continues until the last job in the series is completed. For example, an ETL job can be triggered automatically after a source data is loaded into a staging table and subsequent ETL jobs executed using a push-based approach and a dependency scheduler. A traceability pipeline can help in tracing task, data and dependencies status., including use of a data load state table which is updated when the data is loaded into any of the tables under a UDXA schema; a task state table which contains status of each task, wherein a task is a sequence of jobs to load a particular dashboard; and a dependency state table contains information of each ETL package and its predecessor dependent package. Additional usages include enforcing validation, or improving on a validation logic to detect anomalies.

Data processing component: an onboard-to-data-integration service.

As illustrated in FIGS. 11-13, in accordance with an embodiment, a staging layer 334 can be provided in accordance with the approach described herein to save a snapshot of related source table daily; and then build ETL jobs 332 on top of it and generate core DIM tables. The reason for generating a snapshot of source tables is to make sure a baseline is unchanged for daily jobs, and traceable for any change in core dim tables for consistency.

In accordance with an embodiment, considering the typically large size of source tables, the system can save a copy on the first day, and then keep track of daily changes only for that table, and save the changes as table into an autonomous data warehouse instance. This allows each ETL process to have a fixed daily data source, therefore all results can be traceable and recoverable at any time. A task state table can help push-based task running based on previous task status.

Figure 14:
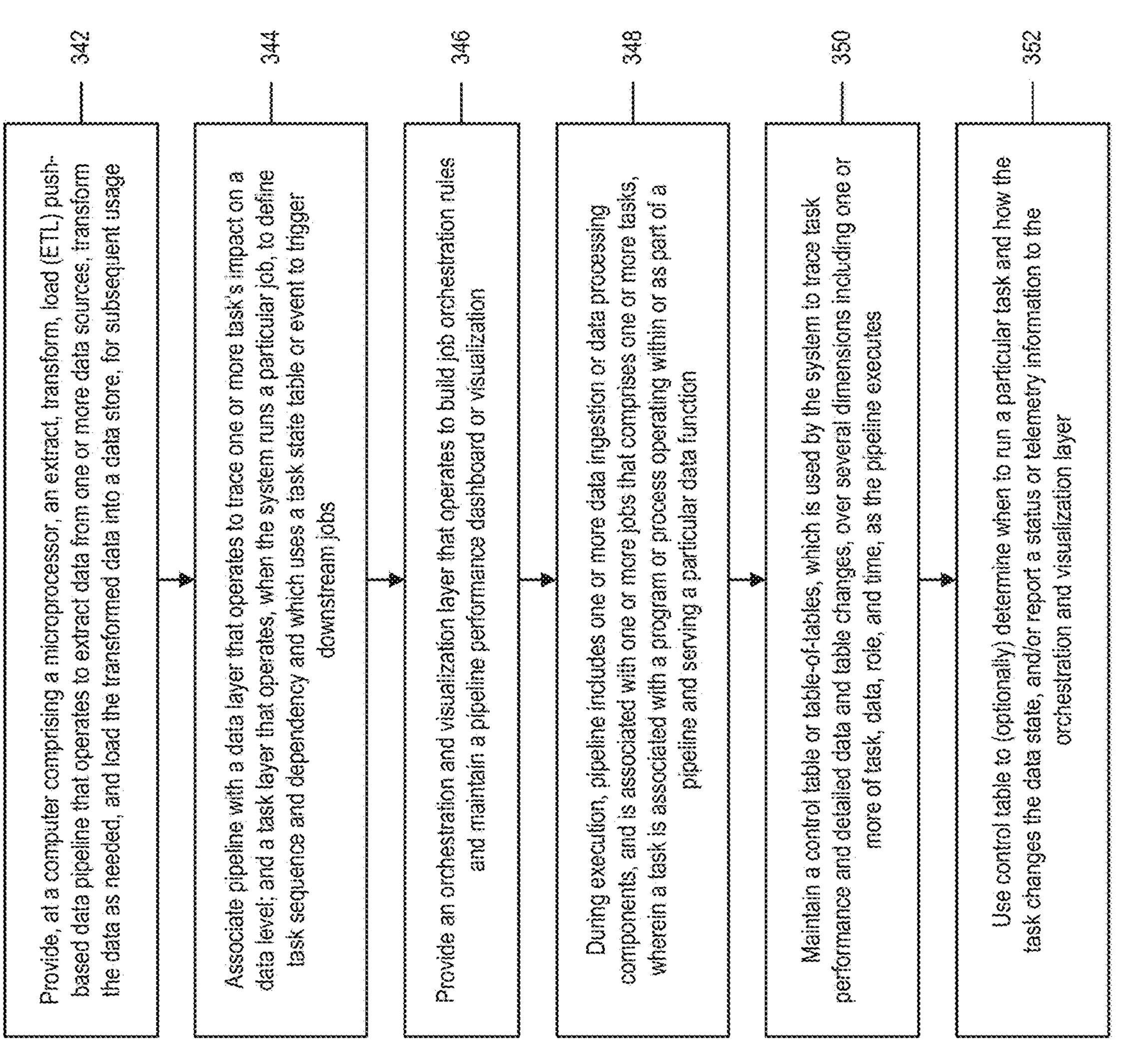
FIG. 14 illustrates a method of providing a traceable push-based pipeline and monitoring of data quality, in accordance with an embodiment.

FIG. 14 illustrates a method of providing a traceable push-based pipeline and monitoring of data quality, in accordance with an embodiment.

As illustrated in FIG. 14, in accordance with an embodiment, at step 342, at a computer comprising a microprocessor, an extract, transform, load (ETL) push-based pipeline is provided that operates to extract data from one or more data sources, transform the data as needed, and load the transformed data into a data store, for subsequent usage.

At step 344, the pipeline is associated with a data layer that operates to trace one or more task's impact on a data level; and a task layer that operates, when the system runs a particular job, to define task sequence and dependency and which uses a task state table or event to trigger downstream jobs.

At step 346, an orchestration and visualization layer is provided that operates to build job orchestration rules and maintain a pipeline performance dashboard or visualization.

At step 348, during execution, the pipeline includes one or more data ingestion or data processing components and is associated with one or more jobs that comprises one or more tasks, wherein a task is associated with a program or process operating within or as part of a pipeline and serving a particular data function.

At step 350, the system maintains a table-of-tables or control table, which is used to trace task performance and detailed data and table changes, over several dimensions including one or more of task, data, role, and time, as the pipeline executes.

At step 352, the control table can be used to determine when to run a particular task and how the task changes the data state, and/or report a status or telemetry information to the orchestration and visualization layer.

In accordance with various embodiments, the teachings herein can be implemented using one or more computer, computing device, machine, or microprocessor, including one or more processors, memory and/or computer readable storage media programmed according to the teachings herein. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, ROMs, RAMs, EPROMs, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Further modifications and variations will be apparent to the practitioner skilled in the art.

The embodiments were chosen and described in order to best explain the principles of the teachings herein and their practical application, thereby enabling others skilled in the art to understand the various embodiments and with various modifications that are suited to the particular use contemplated. It is intended that the scope be defined by the following claims and their equivalents.

What is claimed is:

1. A system for use with extract, transform, load (ETL) environments, comprising:

a computer comprising a microprocessor and a data integration service provided thereon, that operates to read or ingest data from object storage and push it to a data warehouse instance for further processing using an extract, transform, load (ETL) push-based pipeline that operates to extract data from the object storage, transform the data as needed, and load the transformed data into a data store, for subsequent usage;

wherein the pipeline is associated with one or more jobs that comprises one or more tasks, wherein a task is associated with a program or process operating within or as part of the pipeline and serving a particular data function; and an orchestrator that operates over multiple layers, including:

a data layer that operates to trace one or more task's impact on a data level; and a task layer that operates to define task sequence and dependency and to trigger downstream jobs;

wherein the orchestrator operates to build job orchestration rules and provide information to a dashboard;

wherein the system maintains a control table, which operates as a table of tables to trace task performance and data and table changes as the pipeline executes, including:

a data change table that traces data change state and time in data ingestion or data processing components that operate within or as part of the pipeline;

a task state table that traces task state and time associated with a job; and a dependency table that defines upstream and downstream dependency between tasks.

2. The system of claim 1, wherein:

each task is associated with a program or process operating within or as part of the pipeline and serving a particular data function that includes one of data loading, processing, or validation;

each job comprises one or more tasks wherein different jobs run in sequence or parallel, based on configuration;

wherein as jobs execute, the system operates to trace each table change history, over several dimensions including task, data, role, and time, in a data store such as a database or data warehouse.

3. The system of claim 1, wherein the data layer operates to trace each of one or more task's impact on a data level, including one or more source data change, data flow state, table change, or schema change.

4. The system of claim 1, wherein the system includes:

a schema change table that traces historical schema change for a source table;

a data change table that traces data change state and time in the various components that operate within or as part of the pipeline, including data ingestion or data processing components, to indicate a success, partial, or failure;

a task state table that traces task state and time associated with a job; and a dependency table that defines upstream and downstream dependency between tasks.

5. The system of claim 1, comprising, during processing of the pipeline, collecting information for task and data, through the control table or table-of-tables, wherein the task state table and dependency table are bound with the data change table in a same time window, to provide a real-time assessment of the pipeline.

6. The system of claim 1, wherein the system comprises the control table or table-of-tables by which the system can trace each task performance, and detailed data/table changes, and identify a root cause quickly when problems arise or in troubleshooting.

7. The system of claim 1, comprising a user interface or dashboard for monitoring and displaying pipeline health, and data quality monitoring, which automatically tracks each job performance in the pipeline statistically.

8. The system of claim 1, comprising an orchestrator that learns from pipeline health data and task/table change, and operates to identify repeated pipeline issues with root causes.

9. The system of claim 1, wherein the system is provided within a cloud computing environment that operates on a cloud computing infrastructure comprising one or more cloud interfaces or other application program interfaces that provide access to shared cloud resources.

10. A method for use with extract, transform, load (ETL) environments, comprising:

providing, at a computer comprising a microprocessor, a data integration service that operates to read or ingest data from object storage and push it to a data warehouse instance for further processing using an extract, transform, load (ETL) push-based pipeline that operates to extract data from the object storage, transform the data as needed, and load the transformed data into a data store, for subsequent usage;

wherein the pipeline is associated with one or more jobs that comprises one or more tasks, wherein a task is associated with a program or process operating within or as part of the pipeline and serving a particular data function;

orchestrating the pipeline over multiple layers, including:

a data layer that operates to trace one or more task's impact on a data level; and a task layer that operates to define task sequence and dependency and to trigger downstream jobs;

wherein the orchestrator operates to build job orchestration rules and provide information to a dashboard; and maintaining a control table, which operates as a table of tables to trace task performance and data and table changes as the pipeline executes, including:

a data change table that traces data change state and time in data ingestion or data processing components that operate within or as part of the pipeline;

a task state table that traces task state and time associated with a job; and a dependency table that defines upstream and downstream dependency between tasks.

11. The method of claim 10, wherein:

each task is associated with a program or process operating within or as part of the pipeline and serving a particular data function that includes one of data loading, processing, or validation;

each job comprises one or more tasks wherein different jobs run in sequence or parallel, based on configuration;

wherein as jobs execute, the system operates to trace each table change history, over several dimensions including task, data, role, and time, in a data store such as a database or data warehouse.

12. The method of claim 10, wherein the data layer operates to trace each of one or more task's impact on a data level, including one or more source data change, data flow state, table change, or schema change.

13. The method of claim 10, wherein the system includes:

a schema change table that traces historical schema change for a source table;

a data change table that traces data change state and time in the various components that operate within or as part of the pipeline, including data ingestion or data processing components, to indicate a success, partial, or failure;

a task state table that traces task state and time associated with a job; and a dependency table that defines upstream and downstream dependency between tasks.

14. The method of claim 10, comprising, during processing of the pipeline, collecting information for task and data, through the control table or table-of-tables, wherein the task state table and dependency table are bound with the data change table in a same time window, to provide a real-time assessment of the pipeline.

15. The method of claim 10, wherein the system comprises the control table or table-of-tables by which the system can trace each task performance, and detailed data/table changes, and identify a root cause quickly when problems arise or in troubleshooting.

16. The method of claim 10, comprising a user interface or dashboard for monitoring and displaying pipeline health, and data quality monitoring, which automatically tracks each job performance in the pipeline statistically.

17. The method of claim 10, comprising an orchestrator that learns from pipeline health data and task/table change, and operates to identify repeated pipeline issues with root causes.

18. The method of claim 10, wherein the method is performed within a cloud computing environment that operates on a cloud computing infrastructure comprising one or more cloud interfaces or other application program interfaces that provide access to shared cloud resources.

19. A non-transitory computer readable storage medium having instructions thereon, which when read and executed by a computer cause the computer to perform a method comprising:

providing, at a computer comprising a microprocessor, a data integration service that operates to read or ingest data from object storage and push it to a data warehouse instance for further processing using an extract, transform, load (ETL) push-based pipeline that operates to extract data from the object storage, transform the data as needed, and load the transformed data into a data store, for subsequent usage;

wherein the pipeline is associated with one or more jobs that comprises one or more tasks, wherein a task is associated with a program or process operating within or as part of the pipeline and serving a particular data function;

orchestrating the pipeline over multiple layers, including:

a data layer that operates to trace one or more task's impact on a data level; and a task layer that operates to define task sequence and dependency and to trigger downstream jobs;

wherein the orchestrator operates to build job orchestration rules and provide information to a dashboard; and maintaining a control table, which operates as a table of tables to trace task performance and data and table changes as the pipeline executes, including:

a data change table that traces data change state and time in data ingestion or data processing components that operate within or as part of the pipeline;

a task state table that traces task state and time associated with a job; and a dependency table that defines upstream and downstream dependency between tasks.

20. The non-transitory computer readable storage medium of claim 19, wherein the system includes:

a schema change table that traces historical schema change for a source table;

a data change table that traces data change state and time in the various components that operate within or as part of the pipeline, including data ingestion or data processing components, to indicate a success, partial, or failure;

a task state table that traces task state and time associated with a job; and a dependency table that defines upstream and downstream dependency between tasks.

* * * * *